United States Patent
Li

(10) Patent No.: US 9,690,398 B2
(45) Date of Patent: Jun. 27, 2017

(54) CAPACITIVE POINTER

(71) Applicant: WALTOP INTERNATIONAL CORPORATION, Hsinchu (TW)

(72) Inventor: Chung-Hsuan Li, Hsinchu (TW)

(73) Assignee: Walltop International Corporation, Hsinchu (TW)

( * ) Notice: Subject to any disclaimer, the term of this patent is extended or adjusted under 35 U.S.C. 154(b) by 27 days.

(21) Appl. No.: 14/810,785

(22) Filed: Jul. 28, 2015

(65) Prior Publication Data

US 2016/0274684 A1  Sep. 22, 2016

(30) Foreign Application Priority Data

Mar. 17, 2015 (TW) .............................. 104108401 A

(51) Int. Cl.
*G06F 3/033* (2013.01)
*G06F 3/0354* (2013.01)
*G06F 3/044* (2006.01)
*G06F 3/038* (2013.01)

(52) U.S. Cl.
CPC ........ *G06F 3/03545* (2013.01); *G06F 3/0383* (2013.01); *G06F 3/044* (2013.01)

(58) Field of Classification Search
CPC .................................................. G06F 3/03545
USPC ....................................................... 345/179
See application file for complete search history.

(56) References Cited

U.S. PATENT DOCUMENTS

| | | | | |
|---|---|---|---|---|
| 6,623,136 B1* | 9/2003 | Kuo | ....................... | B43K 29/10 345/183 |
| 2004/0246211 A1* | 12/2004 | Perkins | ................ | B43K 21/033 345/79 |
| 2007/0025805 A1* | 2/2007 | Lapstun | ................. | B43K 7/005 401/195 |
| 2010/0170726 A1* | 7/2010 | Yeh | ......................... | G06F 3/044 178/19.03 |
| 2012/0206360 A1* | 8/2012 | Tuan | ................... | G06F 3/03542 345/166 |
| 2013/0321355 A1* | 12/2013 | Teiblum | .............. | G06F 3/03545 345/179 |
| 2015/0070330 A1* | 3/2015 | Stern | ................... | G06F 3/03545 345/179 |

* cited by examiner

*Primary Examiner* — Long D Pham
(74) *Attorney, Agent, or Firm* — Donald E. Stout; Stout, Uxa & Buyan, LLP

(57) ABSTRACT

A capacitive pointer is disclosed. The capacitive pointer comprises a conductive refill, a refill cover, an elastomer, a pressure sensor, a sensor board, a control circuit board, a pointer tip, a first frame and a second frame. The conductive refill penetrates and combines with the refill cover. The pressure sensor is mounted on the sensor board. The conductive refill applies a tip pressure against on the pressure sensor through the refill cover pushing the elastomer to sense the tip pressure of the capacitive pointer. The sensor board electrically connects the control circuit board to calculate a tip pressure value of the capacitive pointer. The pointer tip electrically connects the control circuit board. The first frame and the second frame are located between the conductive refill and the refill cover and combine to secure the control circuit board.

18 Claims, 7 Drawing Sheets

CAPACITIVE POINTER

CROSS-REFERENCE TO RELATED APPLICATIONS

The entire contents of Taiwan Patent Application No. 104108401, filed on Mar. 17, 2015, from which this application claims priority, are expressly incorporated herein by reference.

FIELD OF THE INVENTION

The present invention relates to a pointer, and more particularly to a capacitive pointer.

DESCRIPTION OF THE PRIOR ART

Capacitive touch input technology is widely used in the touch panel, one of advantages is allowing user to proceed input operation via user's hand or a contact object so as to have a multi touch function which can generate a variety of applications according to specific corresponding operations by various gestures. However, user's gestures are not suitable for a more delicate writing input operation, such as the writing input operations with stroke thickness changes. Moreover, input operation by using user's hand also lacks various functions. Thus a capacitive pointer instead of user's hand is used to perform exquisite input operation upon a touch panel with a capacitive touch input function.

Therefore, the invention provide a capacitive pointer apparatus which can allow an user to initiate touch panel input operation by a handheld way so as to meet the requirements of proceeding exquisite and multifunctional writing input operation on a touch panel.

SUMMARY OF THE INVENTION

An object of the present invention is to provide a capacitive pointer apparatus which can allow a user to perform exquisite writing input operation on a touch panel.

According to the object, one embodiment of the present invention provides a capacitive pointer apparatus comprising a conductive refill, a refill column, an elastomer, a pressure sensor, a sensor board, a control circuit board, a pointer tip electrically connecting to the control circuit board, a first frame and a second frame, and a power source. The conductive refill penetrates and combines with the refill column. The pressure sensor is mounted on the sensor board, wherein a tip pressure applied upon the capacitive pointer apparatus is detected by the pressure sensor through pressing the conductive refill, the refill column and the elastomer against the pressure sensor. The sensor board electrically connects to the control circuit board to calculate a tip pressure value applied upon the capacitive pointer apparatus. The pointer tip generates capacitive detection signals with a touch panel to detect coordinates of the capacitive pointer apparatus. The first frame and the second frame are configured to combine to secure the control circuit board. The power source provides the capacitive pointer apparatus with electrical power.

Another embodiment of the present invention provides a capacitive pointer apparatus comprising a conductive refill, a refill column, an elastomer, a pressure sensor, a sensor board, a control circuit board electrically connecting to the sensor board, and a pointer tip electrically connecting to the control circuit board. The conductive refill penetrates and combines with the refill column. The pressure sensor is mounted on the sensor board, while the elastomer is located between the refill column and the pressure sensor. The pointer tip generates capacitive detection signals with a touch panel to detect coordinates of the capacitive pointer apparatus.

Another embodiment of the present invention provides a capacitive pointer apparatus comprising a conductive refill, a refill column, an elastomer, a pressure sensor, a sensor board, a spring being located between the elastomer and the refill column, a control circuit board electrically connecting to the sensor board, a holder being configured to attach with the control circuit board for securing the elastomer, the pressure sensor and the sensor board, and a pointer tip electrically connecting to the control circuit board. The conductive refill penetrates and combines with the refill column. The pressure sensor is mounted on the sensor board, while the elastomer is located between the refill column and the pressure sensor. The pointer tip generates capacitive detection signals with a touch panel to detect coordinates of the capacitive pointer apparatus.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the scale of each component may not be expressly exactly.

Figure 1A:
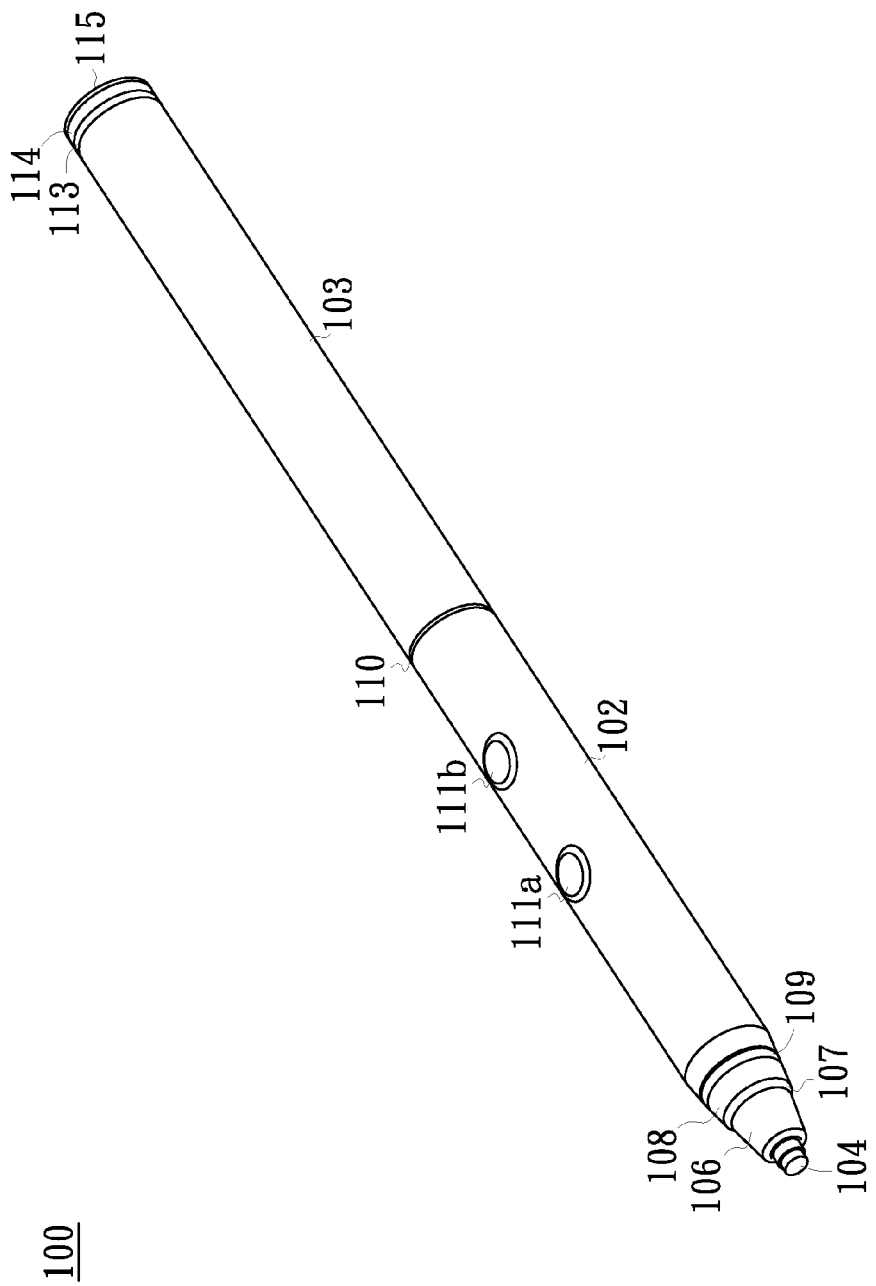
FIGS. 1A to 1G are schematic views of a capacitive pointer apparatus according to one embodiment of the invention.

FIG. 1A is a schematic view of a capacitive pointer apparatus according to one embodiment of the invention. The capacitive pointer apparatus 100 comprises a first tube 102, a second tube 103, a refill cover 104, a pointer tip 106, a pointer head ring 107, a tube head 108, a tube head ring 109, a light ring 110, buttons 111a and 111b, a pointer cap 113, a top pointer cap 114 and a connector socket cover 115.

Figure 1B:
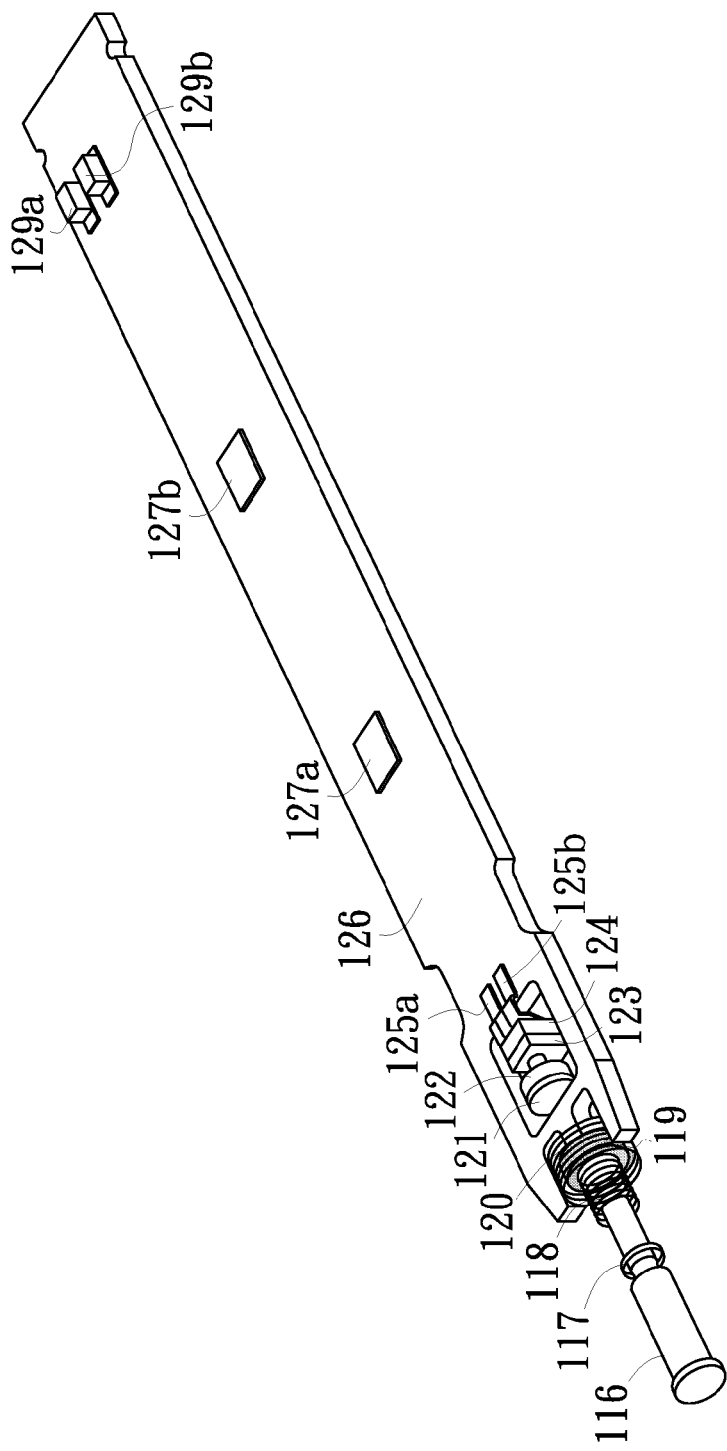

FIG. 1B is a schematic interior view of a capacitive pointer apparatus according to one embodiment of the invention. The interior structure according to one embodiment of the invention shown in FIG. 1B comprises a refill 116, a restraint spring 117, a spring 118, a metal ring 119, a ground spring 120, a washer 121, an elastomer 122, a pressure sensor 123, a sensor board 124, metal connectors 125a and 125b, a control circuit board 126, switches 127a and 127b, and light emitting devices 129a and 129b. The refill 116 comprises a conductive refill. The metal ring 119 comprises a copper ring. The elastomer 122 comprises a rubber. The spring 118 is utilized to provide the refill 116 with a retraction space so that the refill 116 can recoil back to original position after the tip pressure applied on the refill 116 vanishes. The pressure sensor 123 and the sensor board 124 are configured to detect the tip pressure on the refill 116. The pressure sensor 123 and the sensor board 124 connect to the control circuit board 126 through the metal connectors 125a and 125b so as to calculate the tip pressure applied upon the capacitive pointer apparatus 100. The ground spring 120 electrically connects to the control circuit board 126. The light emitting devices 129a and 129b are configured to indicate statuses of the capacitive pointer apparatus 100, such as charging statuses, but not limited to charging statuses. The switches 127a and 127b are configured to select, turn on or turn off various functions of the capacitive pointer apparatus 100. It is noted that the configuration, shape and material of the components of the embodiment mentioned above and shown in FIG. 1B are examples instead of limitations, any equivalents, alternatives or modifications of the embodiment corresponding to the spirit of invention should be encompassed in the scope of the invention. More details about connecting configurations, functions and operations of the components of the embodiment will be further described in the following contents.

Figure 1C:
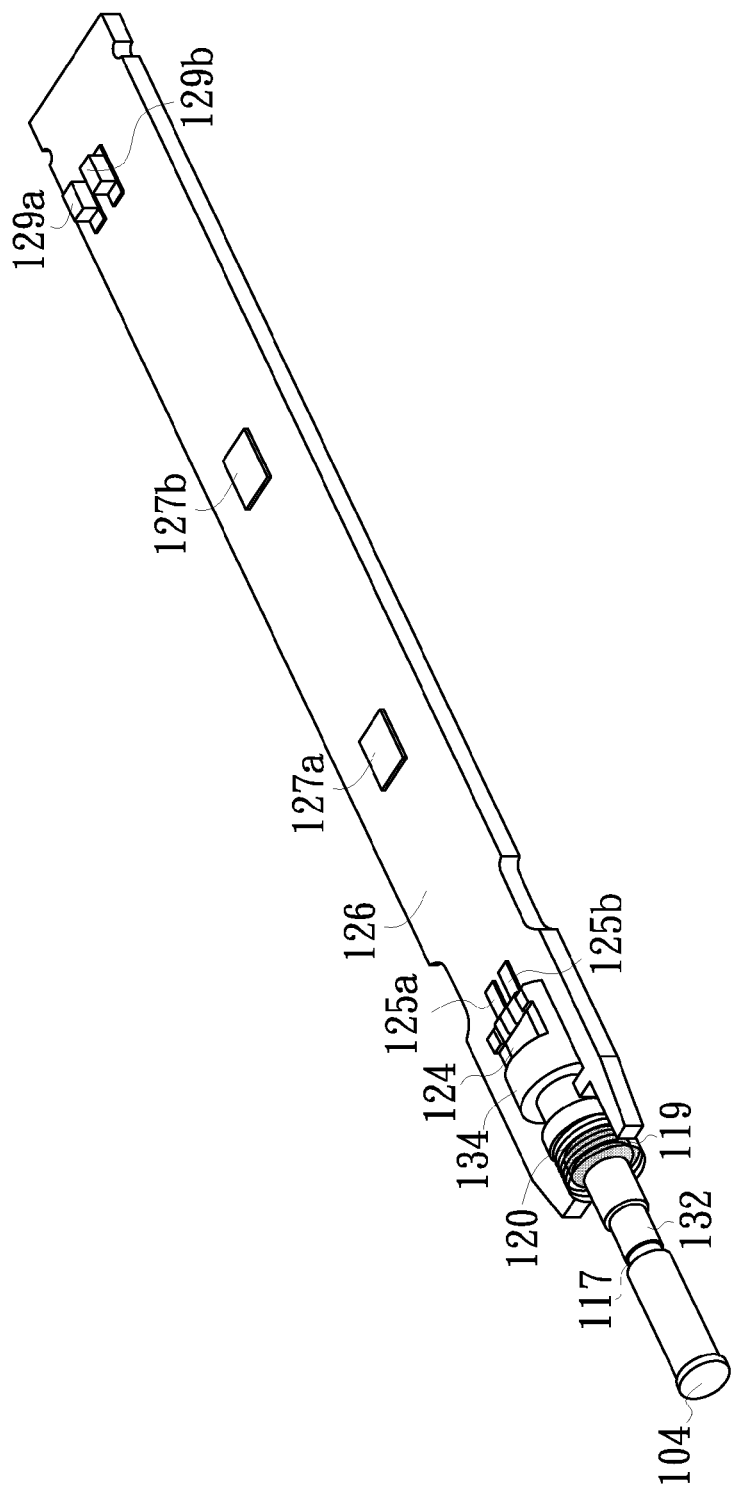

FIG. 1C is a further schematic interior view of the capacitive pointer apparatus shown in FIG. 1B according to one embodiment of the invention. The interior structure according to one embodiment of the invention shown in FIG. 1C further comprises the refill cover 104 shown in FIG. 1A, a refill column 132 and a holder 134. The material of the refill cover 104 comprises a rubber which is used to contact with the screen of a touch panel and to prevent the screen from being scratched by the capacitive pointer apparatus 100. The refill 116 shown in FIG. 1B and the refill column 132 are combined by the restraint spring 117. When a tip pressure is applied upon the refill cover 104 and the refill 116, the refill column 132 combined with the refill 116 applies the tip pressure against the pressure sensor 123 through the washer 121 so that the tip pressure applied on the refill 116 can be detected by the pressure sensor 123 to generate a signal. The signal can be transmitted to the control circuit board 126 via the metal connectors 125a and 125b so as to calculate the value of the tip pressure applied upon the capacitive pointer apparatus 100. The refill cover together with the refill 116 can be replaced with other refill covers and refills with different configurations according to various requirements. The holder 134 is configured to attach with the control circuit board 126 to secure the washer 121, the elastomer 122, the pressure sensor 123 and the sensor board 124.

Figure 1D:
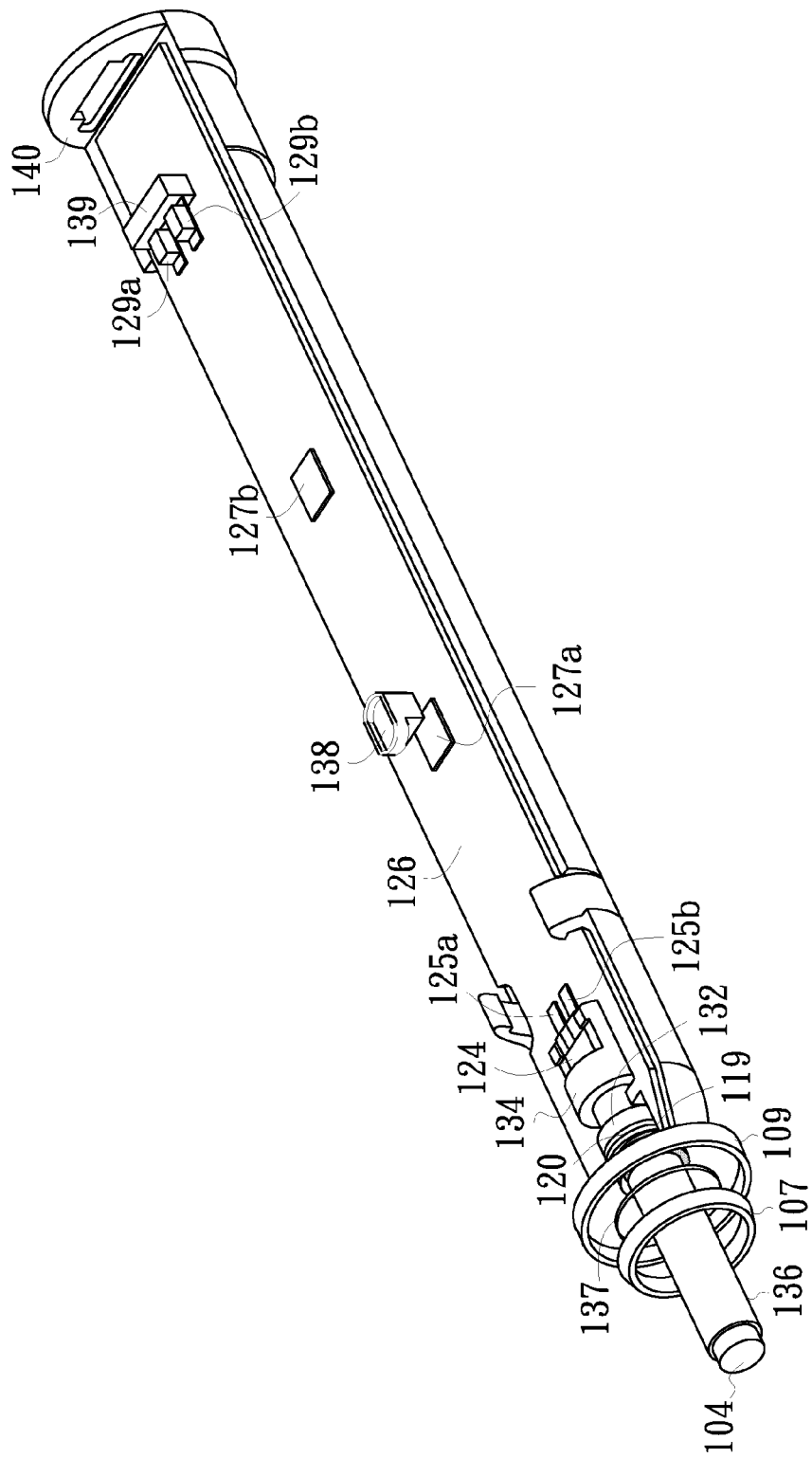

FIG. 1D is a further schematic interior view of the capacitive pointer apparatus shown in FIG. 1C according to one embodiment of the invention. The interior structure according to one embodiment of the invention shown in FIG. 1D further comprises the pointer head ring 107 and the tube head ring 109 shown in FIG. 1A, a refill holder 136, a connecting wire 137, a button holder 138, a light guide 139 and a first frame 140. The connecting wire 137 electrically connects to the control circuit board 126. The pointer tip 106 electrically connects to the control circuit board 126 via the connecting wire 137 so as to calculate the coordinates of the capacitive pointer apparatus 100 through establishing capacitive detection with the detection electrodes of a touch panel. In addition to secure the refill 116, the refill holder 136 is further configured to be a shield between the pointer tip 106 and the refill 116 for shielding high voltage output signals so as to prevent mutual interferences . More details about functions and operations of the components of the embodiment will be further described in the following contents.

Figure 1E:
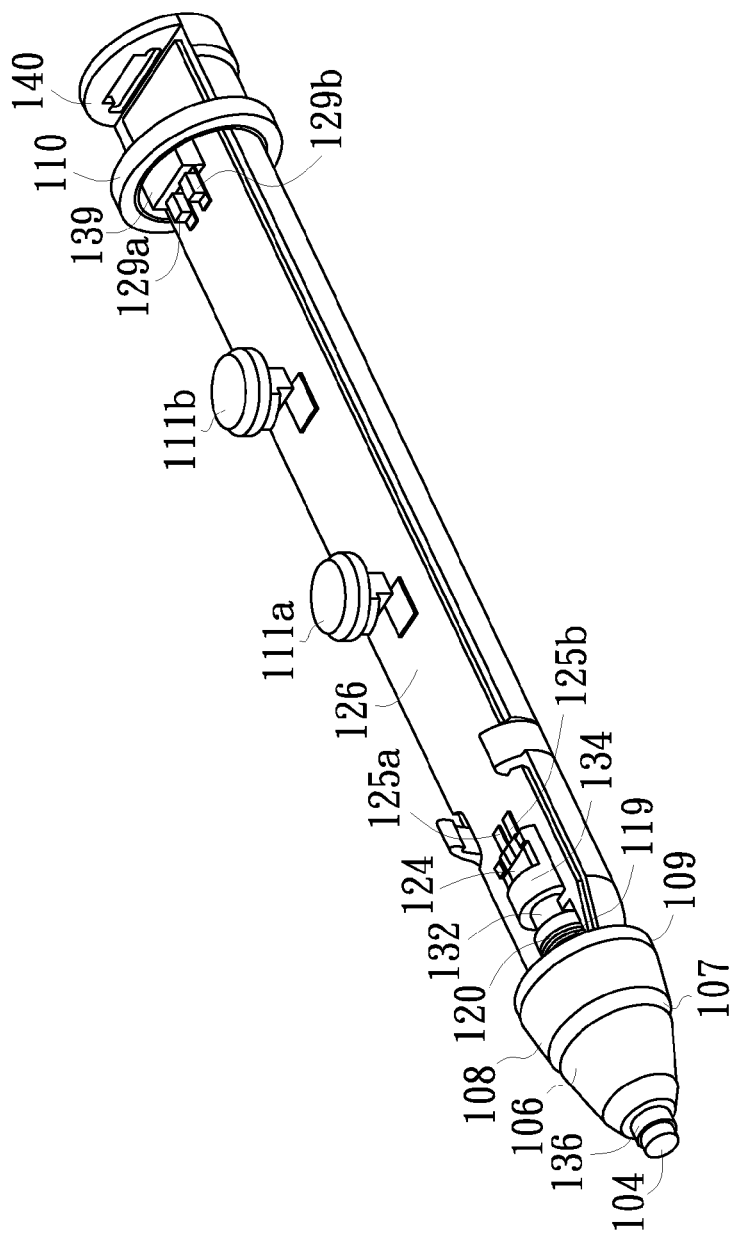

FIG. 1E is a further schematic interior view of the capacitive pointer apparatus shown in FIG. 1D according to one embodiment of the invention. The interior structure according to one embodiment of the invention shown in FIG. 1E further comprises the pointer tip 106, the tube head 108, the light ring 110, and the buttons 111a and 111b shown in FIG. 1A. The pointer tip 106 provides high voltage output signals through an electrical power to generate capacitive detection signals with receiver electrodes (Rx) and transmitter electrodes (Tx) of a touch panel so as to detect and calculate coordinates of the capacitive pointer apparatus 100 and to initiate touch control operations.

Figure 1F:
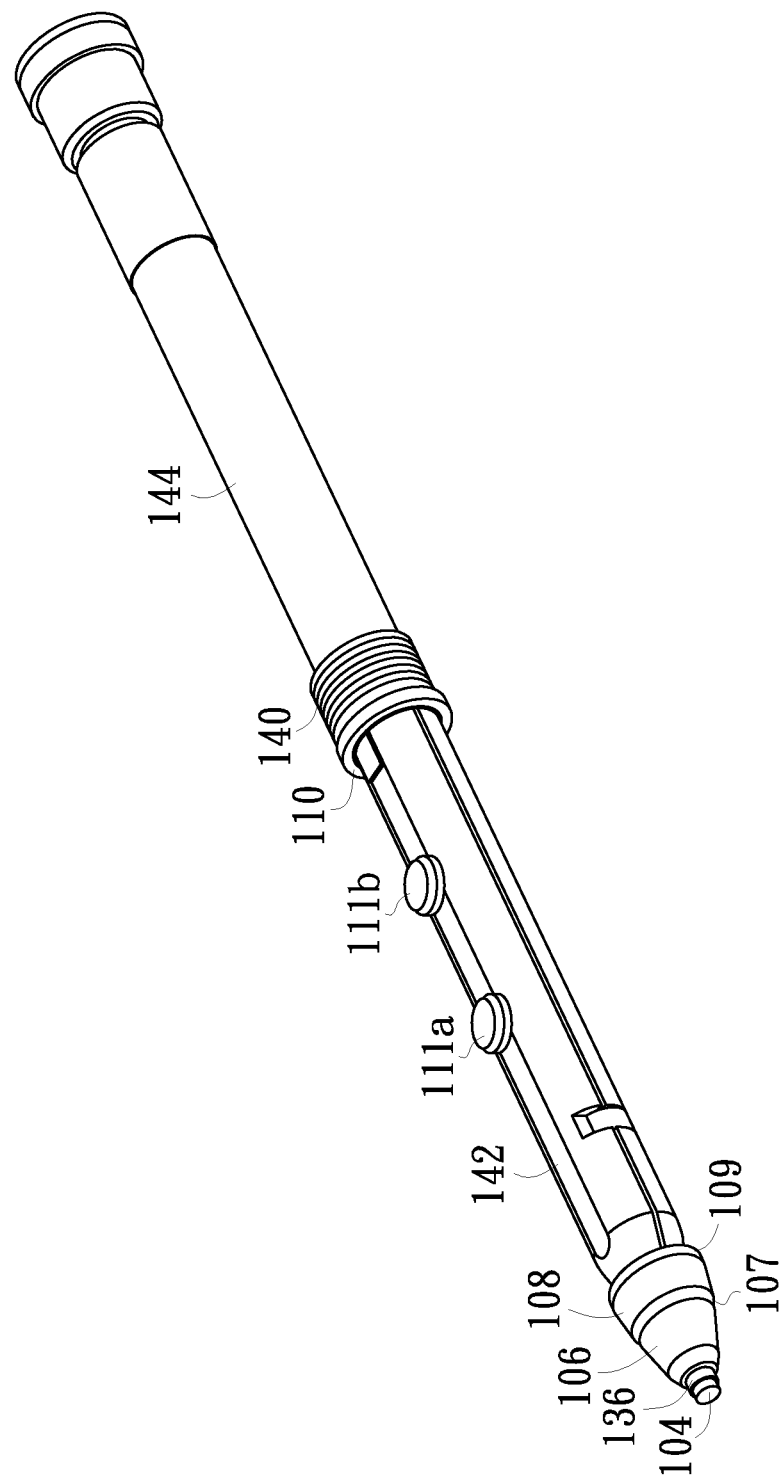

FIG. 1F is a further schematic interior view of the capacitive pointer apparatus shown in FIG. 1E according to one embodiment of the invention. The interior structure according to one embodiment of the invention shown in FIG. 1F further comprises a second frame 142 and a power source 144. The first frame 140 and the second frame 142 combine to secure the control circuit board 126. The power source 144 comprises, but not limited to, a rechargeable lithium battery. The power source 144 provides the pointer tip 106 with electrical power so that the pointer tip 106 provides high voltage output signals and generates capacitive detection signals with receiver electrodes (Rx) and transmitter electrodes (Tx) of a touch panel to initiate touch control operations. The power source 144 also provides the circuits on the control circuit board 126 for calculating coordinates and tip pressures of the capacitive pointer apparatus 100 with electrical power.

Figure 1G:
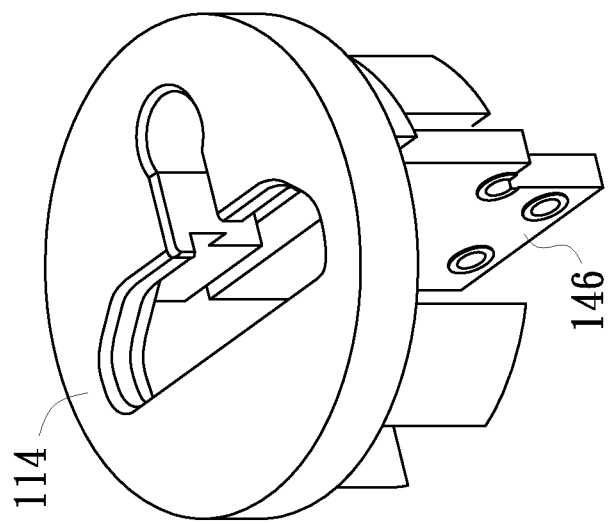

FIG. 1G is a further schematic view of the cap portion of the capacitive pointer apparatus shown in FIG. 1A according to one embodiment of the invention.

The interior structure of the cap portion of the capacitive pointer apparatus shown in FIG. 1G further comprises the top pointer cap 114 shown in FIG. 1A and a port circuit board 146. The top pointer cap 114 and the port circuit board 146 form a connector socket for accepting a connection plug such as a universal serial bus (USB) plug for recharging the power source 144. The connector socket cover 115 is movable to cover the connector socket or to allow the connector socket to accept a connection plug for recharging the power source 144.

Although specific embodiments have been illustrated and described, it will be appreciated by those skilled in the art that various modifications may be made without departing from the scope of the present invention, which is intended to be limited solely by the appended claims.

What is claimed is:
1. A capacitive pointer apparatus, comprising:
a conductive refill and a refill column, the conductive refill penetrating and combining with the refill column;
an elastomer, a pressure sensor and a sensor board, the pressure sensor mounted on the sensor board, wherein a tip pressure applied upon the capacitive pointer apparatus is detected by the pressure sensor through pressing the conductive refill, the refill column and the elastomer against the pressure sensor;
a control circuit board, the sensor board electrically connecting to the control circuit board to calculate a tip pressure value applied upon the capacitive pointer apparatus;
a pointer tip electrically connecting to the control circuit board and surrounding a portion of the conductive refill, the pointer tip generating capacitive detection signals with a touch panel to detect coordinates of the capacitive pointer apparatus;
a shield between the pointer tip and the conductive refill to prevent mutual interferences; and
a power source, the power source providing the capacitive pointer apparatus with electrical power.

2. The capacitive pointer apparatus according to claim 1 further comprising a holder for securing the elastomer, the pressure sensor and the sensor board.

3. The capacitive pointer apparatus according to claim 1 further comprising a ground spring connecting to the control circuit board, the refill column penetrating into the ground spring.

4. The capacitive pointer apparatus according to claim 1 further comprising a refill cover, the refill cover enclosing a portion of the conductive refill.

5. The capacitive pointer apparatus according to claim 1, wherein the refill column and the conductive refill are combined by a restraint spring.

6. The capacitive pointer apparatus according to claim 1 further comprising a spring being on one end of the conductive refill and in the refill column to provide the conductive refill with a retraction space so that the conductive refill can recoil back to an original position after a tip pressure applied on the conductive refill vanishes.

7. The capacitive pointer apparatus according to claim 1, wherein the power source comprises rechargeable lithium battery.

8. The capacitive pointer apparatus according to claim 1 further comprising a connector socket for accepting a universal serial bus plug for recharging the power source.

9. The capacitive pointer apparatus according to claim 8 further comprising a connector socket cover for covering the connector socket.

10. The capacitive pointer apparatus according to claim 1 further comprising a first frame and a second frame, the first frame and the second frame being configured to combine to secure the control circuit board.

11. A capacitive pointer apparatus, comprising:
  a conductive refill and a refill column, the conductive refill penetrating and combining with the refill column;
  an elastomer, a pressure sensor and a sensor board, the pressure sensor mounted on the sensor board, the elastomer being located between the refill column and the pressure sensor;
  a control circuit board electrically connecting to the sensor board;
  a pointer tip electrically connecting to the control circuit board and surrounding a portion of the conductive refill, the pointer tip generating capacitive detection signals with a touch panel to detect coordinates of the capacitive pointer apparatus; and
  a shield between the pointer tip and the conductive refill to prevent mutual interferences.

12. The capacitive pointer apparatus according to claim 11 further comprising a power source, the power source providing the capacitive pointer apparatus with electrical power.

13. The capacitive pointer apparatus according to claim 11 further comprising a spring being located between the elastomer and the refill column.

14. The capacitive pointer apparatus according to claim 11 further comprising a washer being located between the elastomer and the refill column.

15. The capacitive pointer apparatus according to claim 11 further comprising a first tube and a second tube, the first tube and the second tube enclosing a portion of the conductive refill, the refill column, the elastomer, the pressure sensor, the sensor board, and the control circuit board.

16. The capacitive pointer apparatus according to claim 11 further comprising a holder for securing the elastomer, the pressure sensor and the sensor board.

17. The capacitive pointer apparatus according to claim 11 further comprising a connector socket for accepting a universal serial bus plug for recharging the power source.

18. A capacitive pointer apparatus, comprising:
  a conductive refill and a refill column, the conductive refill penetrating and combining with the refill column;
  an elastomer, a pressure sensor and a sensor board, the pressure sensor mounted on the sensor board, the elastomer being located between the refill column and the pressure sensor;
  a spring being located between the elastomer and the refill column;
  a control circuit board electrically connecting to the sensor board;
  a holder being configured to attach with the control circuit board for securing the elastomer, the pressure sensor and the sensor board; and
  a pointer tip electrically connecting to the control circuit board and surrounding a portion of the conductive refill, the pointer tip generating capacitive detection signals with a touch panel to detect coordinates of the capacitive pointer apparatus; and
  a shield between the pointer tip and the conductive refill to prevent mutual interferences.

* * * * *